Patented Feb. 2, 1932

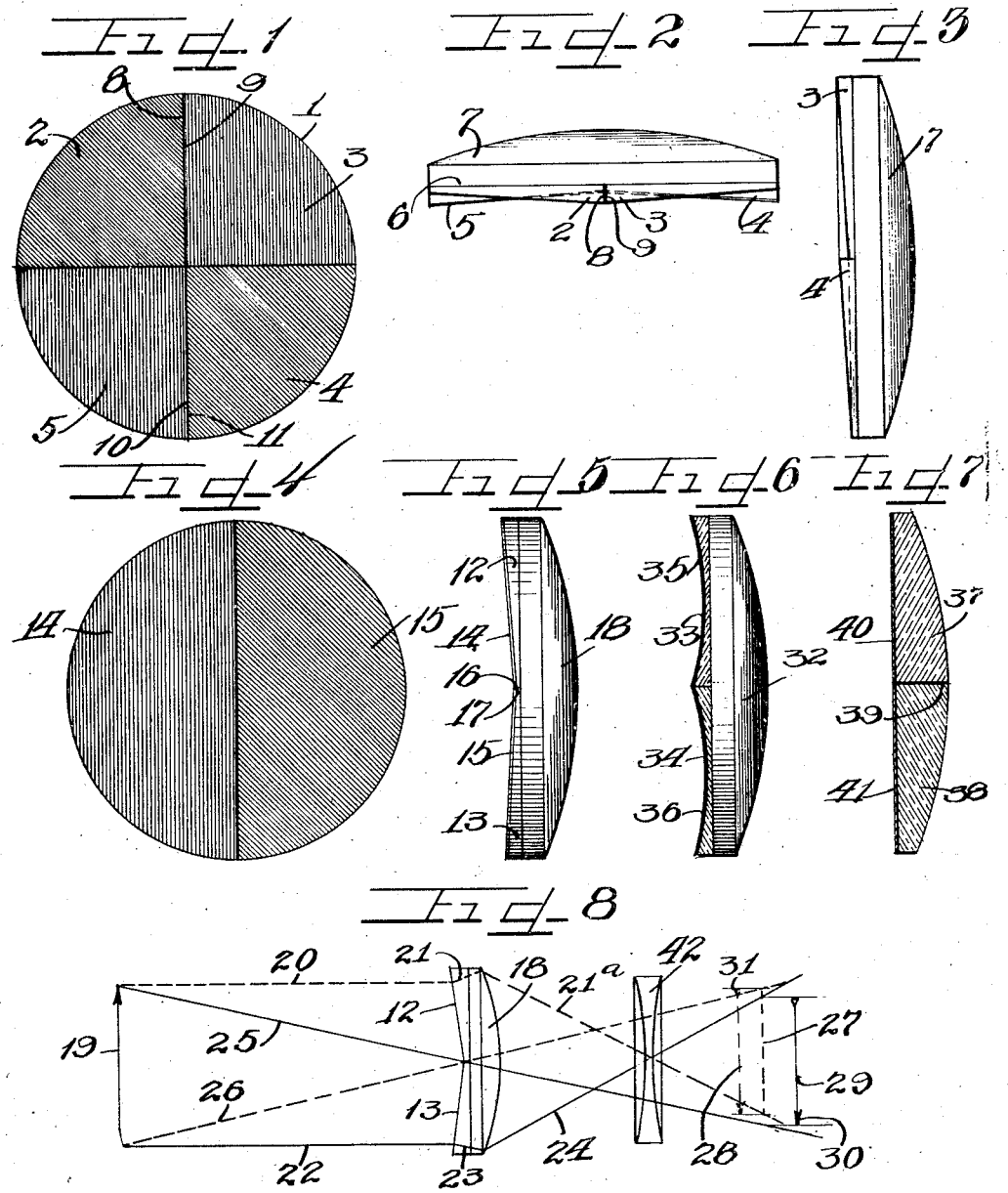

1,843,663

UNITED STATES PATENT OFFICE

NATHANIEL BANKS CREGIER, OF CHICAGO, ILLINOIS

OPTICAL UNIT AND METHOD OF PROJECTING IMAGES TO OBTAIN STEREOSCOPIC RELIEF

Application filed September 25, 1926. Serial No. 137,651.

This invention relates to an optical unit for forming dual colored images and to a method of projecting images to obtain stereoscopic relief.

It has heretofore been found possible to obtain stereoscopic relief in projected images only by elaborate and impracticable methods. One such method as applied to moving pictures consists in taking the picture in duplicate so as to form overlapping objects on the film and then coloring the objects in complementary colors. When the projected image is then viewed through spectacles, the right and left eye pieces of which are colored in complementary colors, a stereoscopic effect is produced. In order to obtain a good stereoscopic effect, the right and left outline of each object on the film must be carefully traced in colors that are substantially complementary to each other. This operation, in the case of moving picture films, is necessarily laborious and expensive and difficult to accomplish with any degree of thoroughness.

It is therefore an object of this invention to provide a suitable optical unit and method for accomplishing in a simple fashion the desired stereoscopic relief in projected images, using the ordinary single exposed black and white film, or plate.

It is a further object of this invention to provide an optical unit that may be used for various purposes but more especially in connection with ordinary projecting lanterns to produce a dual colored projected image, which when viewed through colored spectacles will stand out in stereoscopic relief.

Other and further important objects of this invention will be apparent from the disclosures in the specification and the accompanying drawings.

This invention (in a preferred form) is illustrated in the drawings and hereinafter more fully described.

On the drawings:

Figure 1 is a rear elevational view of an optical unit embodying the principles of my invention in a preferred form.

Figure 2 is a top plan edge view of the same.

Figure 3 is an elevational end view of the same.

Figure 4 is a rear elevational view of a modified form of my invention.

Figure 5 is an end elevational edge view of Figure 4.

Figure 6 is a second modified form of my invention.

Figure 7 is a third modified form of my invention.

Figure 8 is a diagrammatic view illustrating the modus operandi.

As shown on the drawings:

In Figures 1 to 3 inclusive, reference numeral 1 indicates a sphero-prismatic optical unit comprising a plurality of prisms 2, 3, 4 and 5, formed in the present instance in quarter sectors and suitably secured to the rear plane face 6 of a plano convex lens 7. Said prisms 2, 3, 4 and 5 are each formed in the shape of a wedge, with one edge thicker than the other. In accordance with the principles of my invention as will later be explained, the wedge shaped prism 2 is positioned with the base 8 abutting the base 9 of the prism 3. In the case of the prisms 4 and 5, however, the position is reversed and the thinner edges 10 and 11 respectively lie in abutting relation.

In carrying out my invention as it relates to the projection of moving pictures, the prisms 2 and 4 are preferably ground from green glass and the prisms 3 and 5 from red glass. In any case the colors chosen should be substantially complementary to each other and diagonally opposite prisms of the same color. The same effect may also be produced by either covering the faces of the prisms 3 and 4 with separately colored sheets of transparent material or by inserting such material between the prisms and the plane surface 6 of the spherical lens 7. Colored celluloid or cellophane may be used.

The sphero-prismatic optical unit such as above described may be used with an ordinary projecting machine for moving pictures to obtain a stereoscopic effect. The film used is the ordinary single exposed, black and white type. The light from the objects on the film will be colored in passing through the respective prisms and will also be refracted according to the known law of prisms, For instance, rays of light passing through the prism 2 will be colored green and will be refracted in passing through the prism toward the base 8. Similarly, rays passing through the prism 3 will be colored red and will be refracted toward the base 9. In passing through the prism 4, the rays of light will be colored green and will be refracted outwardly, while in passing through the prism 5 the rays of light will be colored red and will be refracted in the opposite outward direction. If the degree of the prisms is suitably chosen, one-half a degree being found satisfactory, the objects on the film will be projected in passing through the optical unit as two images on the screen, these images lying in overlapping relation. This will be apparent from the following explanation. Each of the prisms 2, 3, 4 and 5 in connection with the convergent lens 7 in effect serves to throw a complete image of the object on the screen, but since the prisms 2 and 4 each refract the rays of light from the object in the same direction, namely toward the right, the images formed by these prisms in connection with the convergent effect of the spherical lens 7 will be displaced to the right one-half a degree each and the two green images will thereby be perfectly superimposed. Similarly, light passing through the prisms 3 and 5 is colored red and is refracted toward the left one-half a degree and the two red images thereby perfectly superimposed one over the other. There will thus be formed on the screen dual overlapping images having right and left outlines in complementary colors. It will be appreciated that the overlapping portion of the images will be a neutral color due to the neutralizing effect of the complementary colors red and green. Where the light is projected through blank portions of the film, the color produced on the screen by the blending of the complementary colors will be a creamy white.

The stereoscopic effect is produced upon anyone who views the dual image thrown on the screen through spectacles, the eye pieces of which are complementarily colored transparent material. This result follows from well known principles and does not of itself form a part of my invention, which resides rather in the construction of an optical unit to produce the colored dual image effect on the screen. In general this effect is due to the use of light divergent means in combination with means for coloring the rays in complementary colors and other means for converging the rays to form distinct superimposed images.

In Figures 4 and 5 there is shown a modified optical structure for obtaining the same result. Said structure comprises a pair of semi-circular prisms 12 and 13 having red and green colored transparent films 14 and 15 respectively secured to the surfaces thereof. Said prisms 12 and 13 are joined along their inner edges 16 and 17 respectively with their bases extending outwardly. A plano convex lens 18 is suitably cemented to said prisms 12 and 13 with plane surfaces abutting.

The path of light from an object 19 in passing through the optical unit shown in Figures 4 and 5 is diagrammatically illustrated in Figure 8. For instance, a beam of light represented by the dotted line 20 passing through the head of the arrow 19 representing an object on the film and substantially parallel to the axis of the lens 18 will be deflected on entering the prism 12 in the direction indicated by the divergent line 21. This same beam of light will be refracted again toward the axis by the spherical lens 18 and take a path indicated by the line 21$^a$. In passing through the prism 12 the beam 20 will be colored red and be projected as a red beam of light along the path 21$^a$. Similarly, a beam of light 22 from the other end of the object 19 will be outwardly refracted as at 23 in passing through the prism 13 and will be converged as beam 24 by the lens 18. If now lines 25 and 26 be drawn from the opposite ends of the object 19 to represent beams of light passing substantially through the focal center of the lens 18, the images formed may be represented on a screen 27 by the dotted line 28 and full line 29, shown for the sake of clearness in offset position from the line 27 representing the screen. It will be apparent that these images 28 and 29 will be formed in overlapping position and that the non-overlapping portions of each image will appear colored to correspond with the color of the prism through which the beam of light has passed. For instance, one end of the image 29 represented by the arrow head 30 will be green, whereas the other end of the image 28 represented by the arrow tail 31 will be red. The effect of viewing an overlapping dual colored image such as described through similarly colored spectacles is to give depth to the picture, similar to that obtained by viewing dual pictures through a stereoscope.

At this point it might be well to explain that with either of the optical units above discussed, better results are obtained if a minus lens 42 (Figure 8) is interposed between the optical unit and the screen, preferably beyond the focal points. The effect of the minus lens is, of course, to enlarge the image, but it seems also to render the images on the screen more animate and lifelike.

In Figures 6 and 7 there are shown modified forms of optical units that may be substituted for the forms already described, although in general with less satisfactory results. In Figure 6 there is shown a plano convex lens 32 to the plane side of which are affixed plano concave lenses 33 and 34. Color screens 35 and 36 are used in connection with the plano concave lenses 33 and 34 respectively in a similar way to that already described. It will be apparent that the minus lenses 33 and 34 will serve to diverge the rays of light and in this way will form dual images when used in connection with a converging lens 32.

In Figure 7 there is shown a pair of plano convex lenses 37 and 38 of semi-circular form and joined at their common chord 39. Said lenses 37 and 38 are preferably formed from a single circular lens by dividing said lens in halves and grinding away a portion of each of the newly formed edges. If now the halves 37 and 38 are joined along said edges 39, the optical unit formed will have a divergent effect due to the fact that the curved face is no longer of uniform curvature throughout. Colored screens 40 and 41 may be cemented to the plane surface of said lenses 37 and 38 to get the desired color effect. Instead of grinding away the edges along the diameters of the lenses 37 and 38, said lenses may be separated by an opaque strip and a similar divergent effect obtained.

The optical units as above described may be used in connection with moving picture projectors using the ordinary black and white film and without any other change than the substitution of lenses. The effect is to throw all of the objects on the screen, including the background, into stereoscopic relief. This is accentuated by the black frame surrounding the picture. Formerly, when the films were colored with complementary colors, it was impossible to get this same effect, since obviously the background could not be colored with the minuteness necessary to make it stand out in stereoscopic relief. Accordingly the background would appear to vibrate due to the optical effect.

It will be apparent that the optical units described may be used for other purposes than in moving picture projectors. For instance, an optical unit embodying the principles of my invention may be used in photography for taking dual images. In that case, however, the color screens could be omitted.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a device for rendering projected images stereoscopic in effect, an optical unit for use with an illuminated single exposure film of the black and white type and a projecting screen, comprising in succession light diverging prisms arranged about a common axis for dividing the light from the film into a plurality of complete images, a converging lens having a convergent power so related to the divergent power of the prisms, and so positioned with respect to said prisms and said screen as to form overlapping images on the screen and means for coloring the images in substantially complementary colors, whereby dual overlapping images are formed on the screen which when viewed through eye-pieces of the same colors as the projected images give a stereoscopic illusion.

2. In a device for rendering projected images stereoscopic in effect, an optical unit for use with an illuminated single exposure film of the black and white type, and a projecting screen, comprising in succession, light diverging prisms arranged about a common axis for dividing the light from the film into a plurality of complete images, a converging lens having a convergent power so related to the divergent power of the prisms, and so positioned with respect to said prisms and said screen as to form overlapping images on the screen, and a concave lens, the divergent power of which is less than the convergent power of said convergent lens, whereby a real image will be produced, and means for coloring the images in substantially complementary colors, whereby dual overlaping images are formed on the screen, and when viewed through eye-pieces of the same colors as the projected images, give a stereoscopic illusion.

In testimony whereof I have hereunto subscribed my name.

NATHANIEL BANKS CREGIER.